(12) United States Patent
Maeda et al.

(10) Patent No.: US 7,402,626 B2
(45) Date of Patent: Jul. 22, 2008

(54) TOP COAT COMPOSITION

(75) Inventors: Kazuhiko Maeda, Tokyo (JP);
Haruhiko Komoriya, Saitama (JP);
Shinichi Sumida, Saitama (JP); Satoru Miyazawa, Saitama (JP); Michitaka Ootani, Saitama (JP)

(73) Assignee: Central Glass Company, Limited, Ube-shi (JP)

( * ) Notice: Subject to any disclaimer, the term of this patent is extended or adjusted under 35 U.S.C. 154(b) by 153 days.

(21) Appl. No.: 10/980,769

(22) Filed: Nov. 4, 2004

(65) Prior Publication Data
US 2005/0250898 A1 Nov. 10, 2005

(30) Foreign Application Priority Data
Mar. 31, 2004 (JP) ............................. 2004-104885
Jul. 8, 2004 (JP) ............................. 2004-201439

(51) Int. Cl.
*C08K 3/00* (2006.01)
(52) U.S. Cl. ...................... 524/544; 524/556; 524/565; 526/242; 526/245; 526/319; 526/346; 568/812
(58) Field of Classification Search ................. 524/544, 524/556, 565; 526/242, 245, 319, 346; 568/812
See application file for complete search history.

(56) References Cited

U.S. PATENT DOCUMENTS

| 6,803,434 B2* | 10/2004 | Dilocker et al. ............. 526/204 |
| 6,943,271 B2* | 9/2005 | Sumida et al. .............. 568/659 |
| 6,974,657 B2* | 12/2005 | Berger et al. ............. 430/270.1 |
| 7,105,618 B2* | 9/2006 | Komoriya et al. ........... 526/242 |
| 2005/0202340 A1* | 9/2005 | Houlihan et al. .......... 430/270.1 |
| 2006/0029884 A1* | 2/2006 | Hatakeyama et al. ..... 430/270.1 |
| 2006/0217507 A1* | 9/2006 | Miyazawa et al. .......... 526/242 |

FOREIGN PATENT DOCUMENTS

| JP | 8-305024 A | | 11/1996 |
| JP | 09-325500 A | | 12/1997 |
| JP | 2003-040840 | * | 2/2003 |
| JP | 2003-040840 A | | 2/2003 |
| JP | 2003-295443 | * | 10/2003 |
| JP | 2004-083900 | * | 3/2004 |
| JP | 2004-083900 A | | 3/2004 |
| JP | 2005-029539 A | | 2/2005 |
| WO | WO 02/066526 A1 | | 8/2002 |
| WO | WO-2005/098541 A1 | * | 10/2005 |

OTHER PUBLICATIONS

Mitsuru Sato, "TOK Resist & Metal Development Status for Immersion Lithography", Sematech Litho Forum Jan. 27 to 29, 2004 (Apr. 12, 2005).
Japanese Search Report dated Apr. 26, 2005 including English Translation of Relevant Portion (Twelve (12) pages).
Mitsuru Sato, "TOK Resist & Material Development Status for Immersion Lithography", Sematech Litho Forum 28-29, Jan. 2004, Los Angeles, CA (retrieved on Mar. 29, 2004), Internet: http://www.sematech.org/resources/litho/meetings/forum/20040128/presentations/06_193_Sato_TOK.pdf.

* cited by examiner

*Primary Examiner*—Peter D. Mulcahy
*Assistant Examiner*—Henry Hu
(74) *Attorney, Agent, or Firm*—Crowell & Moring LLP

(57) ABSTRACT

The present invention relates to a top coat composition, which is characterized in that it is applied to a photoresist top surface by using a polymer containing at least one structure represented by the formula [1], [2] or [3]. It is possible to produce a top coat composition solution by dissolving this top coat composition in an organic solvent. These top coat composition and top coat composition solution can be used in immersion lithography.

11 Claims, No Drawings

TOP COAT COMPOSITION

BACKGROUND OF THE INVENTION

The present invention relates to a photoresist top coat composition containing a particular fluorine-containing structure.

Fluorine-based compounds are developed or used in wide applied fields of advanced materials, due to characteristics such as water repellency, oil repellency, low water absorption, heat resistance, weatherability, corrosion resistance, transparency, photosensitivity, low refractive index, and low dielectric property. In particular, resist materials of fluorine-based compounds have recently and actively been studied as novel materials that are highly transparent to short wavelength ultraviolet rays such as F2 and ArF. A common molecular design in these applied fields is based on the achievement of various performances such as transparency at each used wavelength due to the introduction of fluorine, photosensitivity using acid characteristics of fluoroalcohols such as hexafluoroisopropanol (hexafluorocarbinol), adhesion to substrate, and high hardness, that is, glass transition point (Tg).

Recently, immersion lithography has rapidly emerged as a lithography for producing next-generation semiconductors. In particular, the entire business circle pays attention to it as a means for prolonging the lifetime of exposure technique by ArF excimer laser. In this case, liquid (e.g., water) is brought into contact with the photoresist surface. Therefore, how various problems, such as resist swelling, liquid penetration into the resist, and compound elution from the resist, are solved has become an important factor to improve the immersion lithography performance.

As a solving means, there is reported a process of coating the photoresist surface with a polymer protective film (see the following non-patent publication 1). For example, however, it becomes deficient in solubility in developing solution. Thus, it has not reached the level at which the material is optimized. This polymer protective film is a protective film to be coated on the photoresist film. Therefore, it is called a top coat or cover coat.

Non-patent publication 1: Mitsuru Sato, "TOK Resist & Material Development Status for Immersion Lithography", [online], SEMATECH, LITHO FORUM 28-29 JANUARY 2004 LOS ANGELS, Calif., [Searched on Mar. 29, 2004], Internet <http://www.sematech.org/resources/litho/meetings/forum/20040128/presentations/06_193_Sato_TOK.pdf>

There is a demand for a measure to form a top coat by coating a resist film with a coating film, of which both exposed portion and non-exposed portion are dissolved in a developing solution in a short period of time at similar rates, to intercept water from the resist film. In this case, there has been a demand for a polymer compound that simultaneously satisfies performances such as less swelling in water, no corrosion of the photoresist of the underlayer, and the capability of adjusting refractive index of the film.

SUMMARY OF THE INVENTION

Therefore, it is an object of the present invention to provide a top coat composition that is suppressed in swelling and dissolution in water and that is dissolved rapidly in developing solution.

As a result of repeated eager examinations to solve the above task, the present inventors found a novel top coat composition that is suppressed in swelling and dissolution in water, that is dissolved rapidly in developing solution, and that has been made high in adhesion and glass transition point (Tg) and found application to immersion lithography.

According to the present invention, there is provided a top coat composition, characterized in that it is applied to a photoresist top surface by using a polymer containing at least one structure represented by the formula [1], [2] or [3].

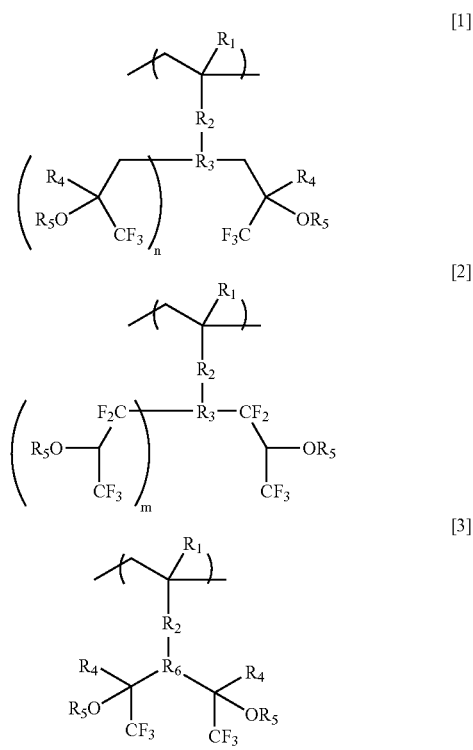

wherein $R_1$ represents hydrogen, fluorine, cyano group, methyl group or trifluoromethyl group, $R_2$ represents O, (C=O)O, $CH_2O$, or a single bond, $R_3$ represents CH or hydroxyl group or cyclohexyl group, phenyl ring, norbornene ring or ring ether, of which hydrogens may partially be replaced with halogen, $R_4$ represents methyl group or trifluoromethyl group, $R_5$ is hydrogen or protecting group that may contain fluorine, n represents 1 or 2, and m represents 0 or 1. Furthermore, $R_6$ represents an alicyclic group or phenyl group.

DETAILED DESCRIPTION

The present invention is suitable for the application to immersion lithography as a novel top coat composition that is suppressed in swelling and dissolution in water, that rapidly dissolves in developing solution and that has been made high in adhesion and glass transition point (Tg), by using a polymer having a structure having a particular fluoroalcohol group in the same monomer.

In the following, embodiments of the present invention are explained in detail. The present invention relates to a top coat composition for immersion lithography that is a coating solution resulting from dissolving in an organic solvent a polymer having a single or plurality of fluorocarbinol groups selected from trifluoromethyl alcohol group, hexafluoroisopropyl alcohol group and pentafluoro alcohol group, which may be protected. The film after coating is insoluble in water and is possible in an alkali aqueous solution based developing solution. In this case, the fluorocarbinol group can be used as one provided to the main chain directly or through a chain or ring form bond. It is used without limitation in its structure.

As a particularly preferable structural unit, there is used a method of applying to a photoresist top surface a polymer containing a single or plurality of fluoroalcohol groups by the formula [1], [2] or [3].

As the types of the polymerization moieties relating to monomers represented by the formulas [1], [2] and [3], it is possible to preferably use acrylate, methacrylate, αCF₃ acrylate, αF acrylate, vinyl ether, allyl ether, substituted olefins and the like.

Although particularly preferable structures of the formula [1] or [3] are specifically exemplified, they are not limited to these.

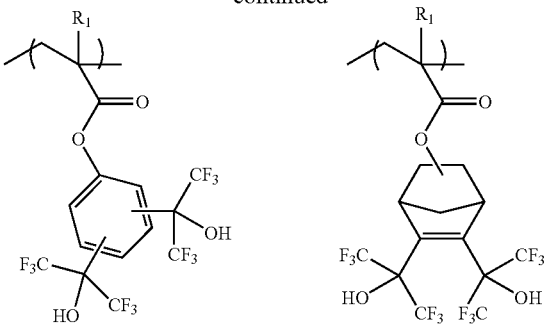

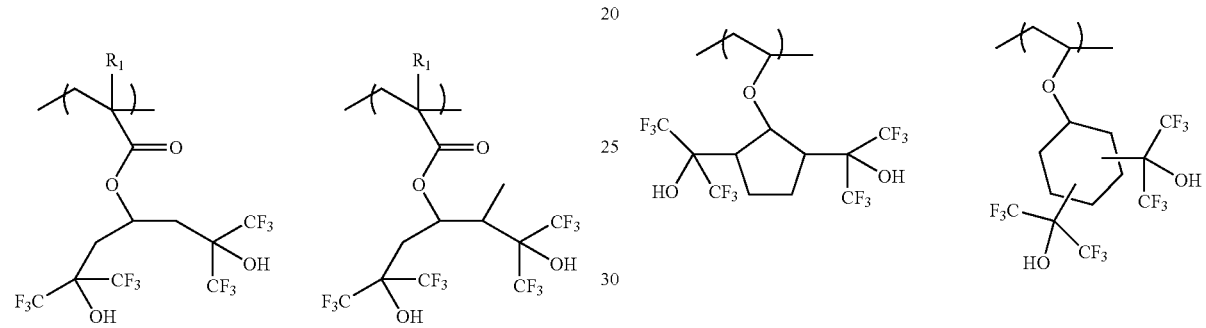

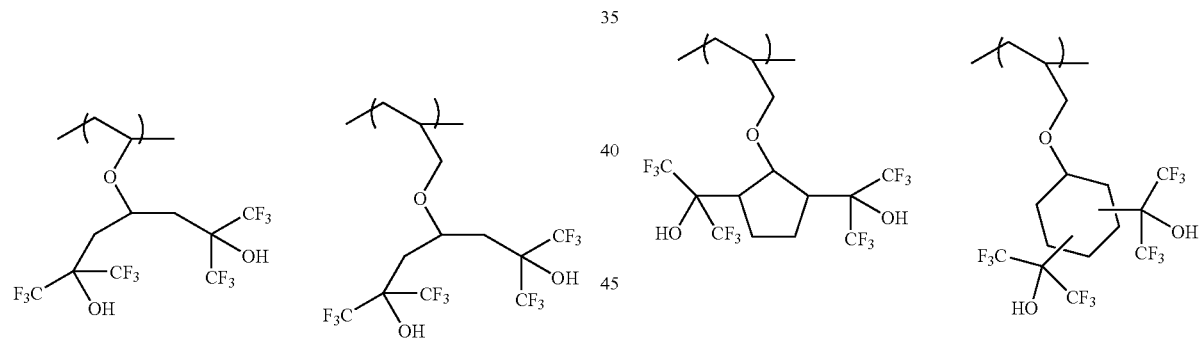

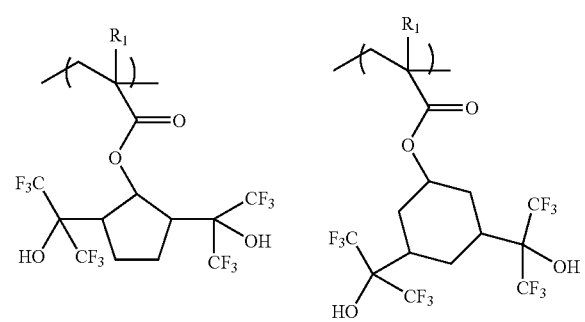

Herein, it is possible to use H, F, CN, CH₃, CF₃ and the like as $R_1$ that is shown in specific examples of the formulas [1] and [3]. In contrast, $R_3$ of the formula [1] is of various hydrocarbon groups and may have a branched structure or ring structure. A part of the hydrogens of $R_3$ may be replaced with ether group, ester group, hydroxyl group, carboxyl group, halogen, nitrile group, amino group, alkyl group, fluoroalkyl group or the like. It may contain a partial unsaturated bond.

Specific examples of the cyclic structure usable as $R_3$ are cyclohexyl, phenyl, norbornane, norbornene, cyclic ethers, adamantane and the like. Although all of specific examples cited here have been explained by using hexafluoroalcohol structure, trifluoroalcohol and a structure of which alcohol moiety is partially protected can preferably be used.

In contrast, the structure represented by the formula [2] is specifically explained.

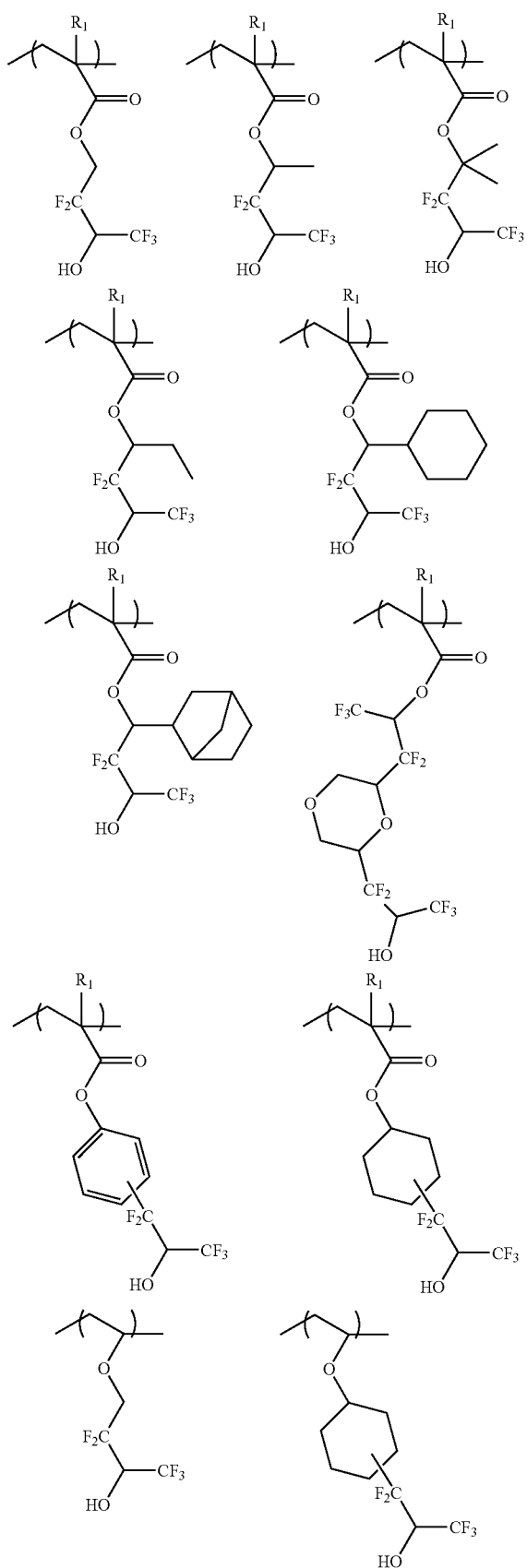

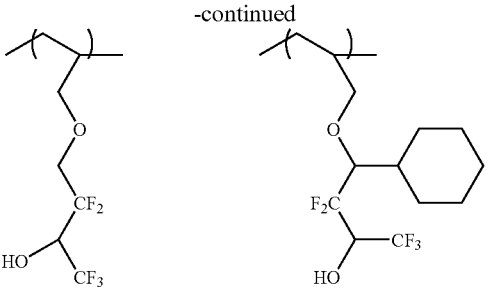

-continued

According to the present invention, as long as a monomer structure of the formula [1], [2] or [3] is contained, another monomer can arbitrarily be copolymerized to the extent that the copolymer is dissolved in developing solution.

That is, in exemplification of a comonomer usable in the present invention, it is possible to use at least one monomer selected from at least olefin, fluorine-containing olefin, acrylic acid, methacrylic acid, acrylates, methacrylates, fluorine-containing acrylic acids, fluorine-containing acrylates, fluorine-containing methacrylates, norbornene compounds, fluorine-containing norbornene compounds, styrene compounds, fluorine-containing styrene compounds, vinyl ethers, fluorine-containing vinyl ethers, cyclic vinyl ethers, vinyl esters, fluorine-containing vinyl esters, allyl ethers, fluorine-containing allyl ethers, acrylonitrile, vinyl silane, maleic anhydride, vinylpyrrolidone, vinylsulfone, and vinylsulfonic acid.

In particular, acrylic acid, methacrylic acid, methacrylates, fluorine-containing acrylates, fluorine-containing methacrylates, norbornene compounds, fluorine-containing norbornene compounds, vinyl ethers, fluorine-containing vinyl ethers, cyclic vinyl ethers, acrylonitrile, maleic anhydride and the like are used as preferable structural units in the present invention, from the viewpoint of copolymerization reactivity and transparency in used wavelengths.

Ethylene, propylene and the like can be exemplified as the olefin. Vinyl fluoride, vinylidene fluoride, trifluoroethylene, chlorotrifluoroethylene, tetrafluoroethylene, hexafluoropropylene, hexafluoroisobutene, octafluorocyclopentene and the like can be exemplified as the fluoroolefin.

Furthermore, as to the acrylate or methacrylate, the ester side chain can be used without particular limitation. To show examples of known compounds, it is possible to use alkyl esters of acrylic acid or methacrylic acid such as methyl acrylate or methacrylate, ethyl acrylate or methacrylate, n-propyl acrylate or methacrylate, isopropyl acrylate or methacrylate, n-butyl acrylate or methacrylate, isobutyl acrylate or methacrylate, n-hexyl acrylate or methacrylate, n-octyl acrylate or methacrylate, 2-ethylhexyl acrylate or methacrylate, lauryl acrylate or methacrylate, 2-hydroxyethyl acrylate or methacrylate, and 2-hydroxypropyl acrylate or methacrylate; acrylates or methacrylates containing ethylene glycol, propylene glycol and tetramethylene glycol groups; unsaturated amides such as acrylamide, methacrylamide, N-methylolacrylamide N-methylolmethacrylamide, and diacetoneacrylamide; acrylonitrile, methacrylonitrile, alkoxysilane-containing vinyl silane, acrylic or methacrylic esters, t-butyl acrylate or methacylate, 3-oxocyclohexyl acrylate or methacrylate, adamantyl acrylate or methacrylate, alkyladamantyl acrylate or methacrylate, cyclopentyl or cyclohexyl acrylate or methacrylate, cyclopentyl or cyclohexyl acrylate or methacrylate having one or two hydroxyl groups, adamantyl acrylate or methacrylate having one or two hydroxyl groups, tricyclodecanyl acrylate or methacrylate, butyllactone, an acrylate or methacrylate having a special lactone ring having a norbornane ring and a lactone ring, an acrylate or methacrylate resulting from a direct or indirect esterification of a norbornane ring, acrylic acid, methacrylic acid, and the like. The above-mentioned various cyclic acrylates or methacrylates may be any of primary, secondary and tertiary esters. Furthermore, it is possible to use acrylate, methacrylate, norbornene, styrene and the like of a structure having one hexafluorocarbinol group at a side chain. Furthermore, it is also possible to use various acrylates, methacrylates, norbornenes and styrenes having sulfonic acid, carboxylic acid, hydroxyl group and cyano group at their side chains. Furthermore, it is possible to copolymerize the above-mentioned acrylate compounds containing α-cyano group and their analogous compounds such as maleic acid, fumaric acid, and maleic anhydride.

In particular, a process of copolymerizing acrylonitrile is preferably used for the purpose of adjusting refractive index to an arbitrary value by a combination with fluorine having low refractive index property.

Furthermore, after copolymerization of maleic anhydride, there is preferably used a monomer represented by the formula resulting from esterification using one or two alcohols.

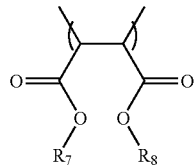

[4]

wherein $R_7$ and $R_8$ are alkyl groups optionally containing hydrogen and cyclic form and may contain fluorine, alcohol and oxygen. Herein, $R_7$ and $R_8$ may be the same or different. Preferably used $R_7$ and $R_8$ are alkyl groups such as methyl and ethyl group, fluoroalkyl groups such as trifluoroethyl group and hexafluoro group, and cyclic alkyl groups such as hexyl group and adamantyl group. A part of them can be provided with a substituent, such as halogen, hydroxyl group, carboxyl group, amino group and nitrile group, without limitation.

Preferable fluorine-containing cyclic groups usable as $R_7$ and $R_8$ can be used without particular limitation, as long as they contain a cyclic structure and fluorine. In particular, the following structures can preferably be exemplified.

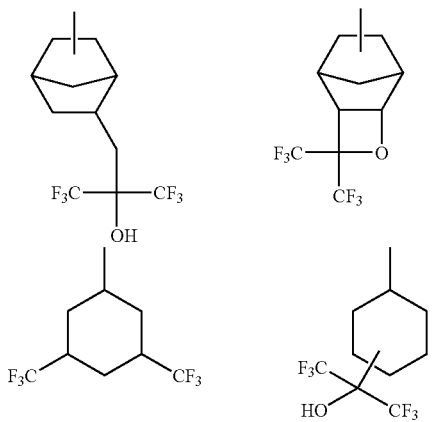

-continued

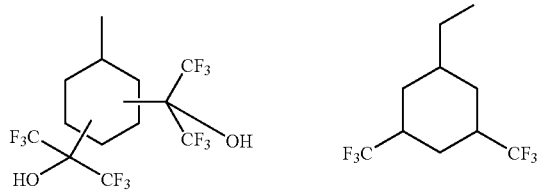

Furthermore, at least one structure represented by the formula [1], [2] or [3] can be copolymerized with a structure containing the formula [5].

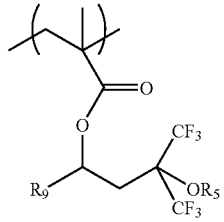

[5]

wherein $R_9$ represents an alicyclic group or aryl group. Herein, examples of the alicyclic group preferably used are monocyclic or polycyclic structures such as cyclopentane ring, cyclohexane ring, norbornane ring, adamantane ring and the like. A part of the hydrogens may be replaced with fluorine and other halogens or alkyl groups and fluoroalkyl groups.

The fluorine-containing acrylates and the fluorine-containing methacrylates are acrylates and methacrylates having a fluorine-atom-containing group at the acrylic a-position or ester moiety. For example, the monomer having a fluorine-containing alkyl group introduced into the α-position is a monomer provided with a trifluoromethyl group, trifluoroethyl group, nonafluoro-n-butyl group or the like at the α-position of the above-mentioned non-fluoro acrylate or methacrylate. In contrast, it is an acrylate or methacrylate having a perfluoroalkyl group or fluorine-containing alkyl group, in which the ester moiety has partially or entirely been replaced with fluorine, or a unit in which a cyclic structure and fluorine are coexistent at the ester moiety. The cyclic structure is a fluorine-containing benzene ring replaced, for example, with fluorine or trifluoromethyl group, fluorine-containing cyclopentane ring, fluorine-containing cyclohexane ring, fluorine-containing cycloheptane ring or the like. Furthermore, it is also possible to use an acrylate or methacrylate in which ester moiety is a fluorine-containing t-butyl ester group. In exemplifying particularly representative ones of such units in the form of monomer, there are cited 2,2,2-trifluoroethylacrylate, 2,2,3,3-tetrafluoropropylacrylate, 1,1,1,3,3,3-hexafluoroisopropylacrylate, heptafluoroisopropylacrylate, 1,1-dihydroheptafluoro-n-butylacrylate, 1,1,5-trihydrooctafluoro-n-pentylacrylate, 1,1,2,2-tetrahydrotridecafluoro-n-octylacrylate, 1,1,2,2-tetrahydroheptadecafluoro-n-decylacrylate, 2,2,2-trifluoroethylmethacrylate, 2,2,3,3-tetrafluoropropylmethacrylate, 1,1,1,3,3,3-hexafluoroisopropylmethacrylate, heptafluoroisopropylmethacrylate, 1,1-dihydroheptafluoro-n-butylmethacrylate, 1,1,5-trihydrooctafluoro-n-pentylmethacrylate, 1,1,2,2-tetrahydrotridecafluoro-n-octylmethacrylate, 1,1,2,2-tetrahydroheptadecafluoro-n-decylmethacrylate, perfluorocyclohexylmethylacrylate, perfluorocyclohexylmethylmethacrylate, and the like. Furthermore, it is also possible to use an acidic monomer provided at its side chain terminal with a trifluoro or hexafluorocarbinol group or a monomer protected with an acid-labile group or another functional group, without structural limitation.

The norbornene compounds and the fluorine-containing norbornene compounds are norbornene monomers having a mononuclear or polynuclear structure. These can also be copolymerized without particular limitation.

Furthermore, it is also possible to use styrene compounds, fluorine-containing styrene compounds, vinyl ethers, fluorine-containing vinyl ethers, allyl ethers, vinyl esters, vinyl silane and the like. Herein, as the styrene compounds and the fluorine-containing styrene compounds, it is possible to use styrene compounds resulting from a bonding of a single or plurality of hexafluorocarbinols, styrene or hydroxystyrene containing trifluoromethyl group substituted for hydrogen, and the above styrene or fluorine-containing styrene compound in which halogen, alkyl group or fluorine-containing alkyl group is bonded to the α-position, besides styrene, fluorinated styrene, hydroxystyrene and the like.

In contrast, as the vinyl ethers, the fluorine-containing vinyl ethers and the like, it is possible to use alkyl vinyl ethers optionally containing methyl group, ethyl group, and hydroxyl group such as hydroxyethyl group and hydroxybutyl group, cyclohexyl vinyl ether and cyclic vinyl ethers having hydrogen and carbonyl bond in their cyclic structure, and fluorine-containing vinyl ethers and perfluoro vinyl ethers having fluorine substituted for hydrogen of unsaturated bond. Furthermore, it is possible to use allyl ethers, vinyl esters and vinyl silanes without particular limitation as long as they are known compounds. Furthermore, of vinyl ether monomers and allyl ether monomers, it is possible to use acidic monomers provided at their side chain terminal with a trifluoro or hexafluoro carbinol group or monomers protected with an acid-labile group or another functional group, without limitation in their structure.

These copolymerizable compounds may be used singly or in combination of at least two types. According to the present invention, although the copolymerization composition proportion of the formula [1], [2] or [3] is adopted without particular limitation, it is preferably selected between 5-100% from the point of solubility in developing solution. More preferably, it is 10-100%.

The polymerization method of a polymer compound according to the present invention is not particularly limited, as long as it is a generally used method. Radical polymerization, ionic polymerization and the like are preferable. In some cases, it is possible to use coordinated anionic polymerization, living anionic polymerization and the like. Herein, a more general radical polymerization is explained. That is, it may be conducted by a known polymerization method, such as bulk polymerization) solution polymerization, suspension polymerization or emulsion polymerization, in the presence of a radical polymerization initiator or radical initiating source, with a batch-wise, half-continuous or continuous operation.

The radical polymerization initiator is not particularly limited. As its examples, azo compounds, peroxide compounds and redox compounds are cited. In particular, azobisbutyronitrile, t-butylperoxypivalate, di-t-butylperoxide, i-butylperoxide, lauroylperoxide, succinic acid peroxide, dicinnamylperoxide, di-n-propylperoxydicarbonate, t-butylperoxyallyl monocarbonate, benzoyl peroxide, hydrogen peroxide, ammonium persulfate, and like are preferable. Furthermore, it is possible to use ones containing a hydroxyl group, carboxyl group or sulfonic acid group at a terminal of the initiator and initiators replaced partially or entirely with fluorine.

The reaction vessel used in the polymerization reaction is not particularly limited. Furthermore, a polymerization solvent may be used in the polymerization reaction. Representative polymerization solvents are ester solvents such as ethyl acetate and n-butyl acetate; ketone solvents such as acetone and methyl isobutyl ketone; hydrocarbon solvents such as toluene and cyclohexane; and alcohol solvents such as isopropyl alcohol and ethylene glycol monomethyl ether. Furthermore, it is also possible to use various solvents such as water, ethers, cyclic ethers, fluorohydrocarbons, and aromatics. These solvents can be used singly or in combination of at least two types. Furthermore, it may be accompanied in use with a molecular weight adjusting agent such as mercaptan. The reaction temperature of the copolymerization reaction is suitably changed depending on the radical polymerization initiator or radical polymerization initiating source. In general, 0-200° C. is preferable. In particular, 30-140° C. is preferable.

As method of removing an organic solvent or water that is a medium from the thus obtained solution or dispersion of a polymer compound according to the present invention, any known method can be used. As examples are cited, there is a method such as reprecipitation filtration or heated distillation or the like.

As the number average molecular weight of a polymer compound according to the present invention to be obtained, a range of 1,000-100,000 is generally appropriate, and a range of 2,000-20,000 is preferably appropriate.

In the present invention, the obtained polymer for top coating is used, after it is formed into a top coat composition solution by dissolving it in an organic solvent or in a mixed solution of alkali aqueous solution or water and organic solvent. The usable solvent is preferably selected from ones that hardly corrode the underlayer resist film and hardly extract an additive and the like from the resist film and that have a boiling point range suitable for spin coating, that is, a boiling point of about 70° C.-170° C.

The organic solvents that hardly corrode resist films and hardly extract additives from resist films depend on the underlayer resist film composition. Various hydrocarbon solvents, alcohols, ethers, esters, fluorine-containing solvent, and the like are cited.

Specifically and preferably, alkane hydrocarbon solvents such as pentane, hexane, heptane, octane, nonane, decane and the like, and alicyclic hydrocarbon solvents and hydrocarbonaceous alcohols such as (normal, iso and tertiary) butanols, methyl ethyl carbinol, pentanol, amyl alcohol, hexyl alcohol, heptyl alcohol and the like, and more preferably hydrocarbon solvents partially replaced with fluorine are preferably adopted. Specifically, it is possible to use alkane and alicyclic hydrocarbon solvents and hydrocarbonaceous alcohols, in which the hydrogen(s) have partially been replaced with fluorine(s), as the hydrocarbon solvents partially replaced with fluorine. By using fluorine, it is possible to effectively dissolve a polymer compound of the present invention and to conduct a coating that does not damage the underlayer resist film.

Of the above solvents, hydrocarbons and hydrocarbonaceous alcohols of a particular carbon number are preferable in relation to boiling point. If the carbon number is too small, the boiling point is lower than 70° C. If the carbon number is too large, the boiling point exceeds 170° C. This is not suitable for spin coating.

Therefore, one type or a mixed solvent of at least two types selected from the group consisting of alkane or alicyclic hydrocarbons of carbon number of 5-20, hydrocarbonaceous alcohols of carbon number of 1-20, and ones resulting from partially replacing the above hydrocarbons or the hydrocarbonaceous alcohols with fluorine is preferable.

More preferably, one type or a mixed solvent of at least two types selected from the group consisting of alkane or alicyclic hydrocarbons of carbon number of 5-10, hydrocarbonaceous alcohols of carbon number of 1-10, and ones resulting from partially replacing these hydrocarbons or hydrocarbonaceous alcohols with fluorine is cited.

As a composition of hydrocarbon and hydrocarbonaceous alcohol to provide a boiling point suitable for spin coating, a solvent resulting from mixing a hydrocarbon of a carbon number of 5-20 in an amount that is not lower than 50% and is lower than 99.9% and a hydrocarbonaceous alcohol of a carbon number of 1-20 in an amount that is not lower than 0.1% and is lower than 50% is preferable.

More preferably, a solvent resulting from mixing a hydrocarbon of a carbon number of 5-10 in an amount that is not lower than 50% and is lower than 99.9% and a hydrocarbonaceous alcohol of a carbon number of 1-10 in an amount that is not lower than 0.1% and is lower than 50% is cited.

Furthermore, according to the present invention, it is possible to previously add an additive, such as acid generator and quencher, to the top coat, in the case of having an extract from the underlayer, for the purpose of minimizing its effect. In particular, in the case of adding acid generator in the present application, an advantageous effect of improving resolution capability of the underlayer resist in immersion lithography appears.

Furthermore, a hydrophobic additive for suppressing the effect on water swelling and penetration, and an acidic additive for accelerating solubility in developing solution, and the like can preferably be used.

The top coat composition according to the present invention can be used without having limitation in the underlayer resist type. That is, it can preferably be used, even if the underlayer resist is an arbitrary resist system such as negative type, positive type and complex type. Furthermore, it can be used without having dependence on various light sources such as 193 nm ArF excimer laser, 157 nm represented vacuum ultraviolet region $F_2$ laser, or active energy rays such as electron rays and X rays, corresponding to trend toward particularly recent finer semiconductors. In particular, a top coat of the present invention is preferably applied in immersion lithography.

That is, in the case of using the present invention in a device production using immersion lithography, a resist composition solution is firstly applied to a support, such as silicon wafer and semiconductor production substrate, with a spinner, followed by drying to form a photosensitive layer, then forming on its surface a top coat by a polymer according to the present invention with a spinner, then drying, then immersion in water or the like, and then laser light irradiation through a desired mask pattern. Then, after heating this, a developing treatment is conducted by using a developing solution, for example, an alkali aqueous solution such as 0.1-10 wt % tetramethylammonium hydroxide aqueous solution. With this, the top coat is fully dissolved by a single development treatment and at the same time the resist film of the exposed part is dissolved, thereby leaving only a resist pattern by one-step development.

In the following, although the present invention is more specifically explained by reference to examples, the present invention is not limited to only these examples.

Polymer compound synthesis examples for top coat compositions are shown in Examples 1-13 and Example 27.

Preparation examples of top coat composition solutions resulting from dissolving the above polymer compounds in solvents are shown in Examples 13-24 and Examples 28-31.

A coating example of a top coat film onto a photoresist film is shown in Example 25. Coating and development examples of a top coat film onto a photoresist film are shown in Example 26 and Example 32.

Furthermore, a synthesis example of a resist composition and a resist film is shown as Reference Example, and a phenomenal example in a top-coat-free system is finally shown as Comparative Example.

EXAMPLE 1

Synthesis of Polymer Compound (2)

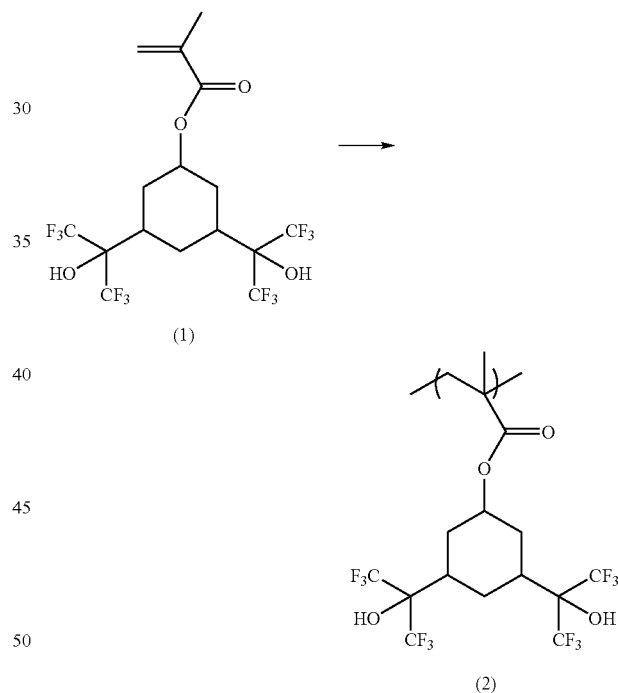

A 500 ml round-bottom flask equipped with a reflux condenser and a stirrer was charged with the compound (1) (50 g), azobisbutyronitrile (AJBN) (0.8g), n-dodecylmercaptan (1.0 g), and methyl ethyl ketone (200 ml), followed by replacing the flask interior with nitrogen. This was heated in an oil bath of 75° C., and stirring was conducted for 18 hr. After the end of the reaction, the reaction solution was added to n-hexane (1,600 ml), followed by stirring. The resulting precipitate was filtered and taken out. This was dried at 50° C. for 20 hr, thereby obtaining the polymer compound (2) (22 g) of a white color solid. The molecular weight was determined by GPC (standard polystyrene). The polymerization reaction is shown in Table 1, and its results are shown in Table 2.

EXAMPLE 2

Synthesis of Polymer Compound (4)

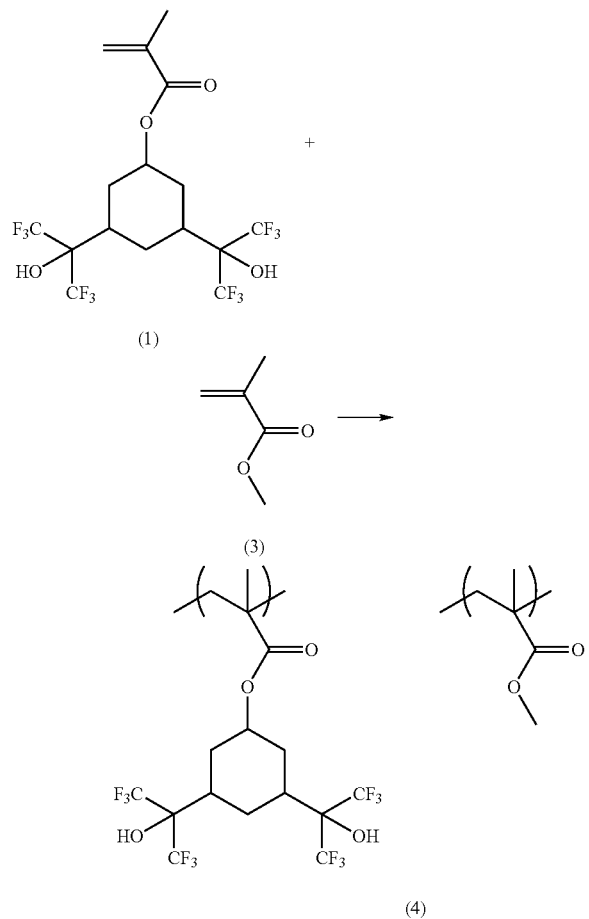

Similar to the method described in Example 1, a copolymerization reaction of the compound (1) and the compound (3) was conducted, thereby obtaining the polymer compound (4). The polymerization reaction is shown in Table 1. The obtained polymer compound is shown in Table 2.

EXAMPLE 3

Synthesis of Polymer Compound (7)

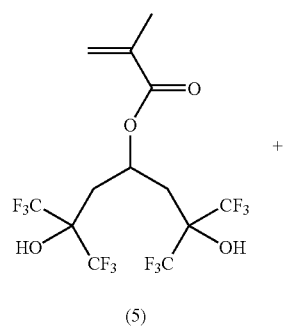

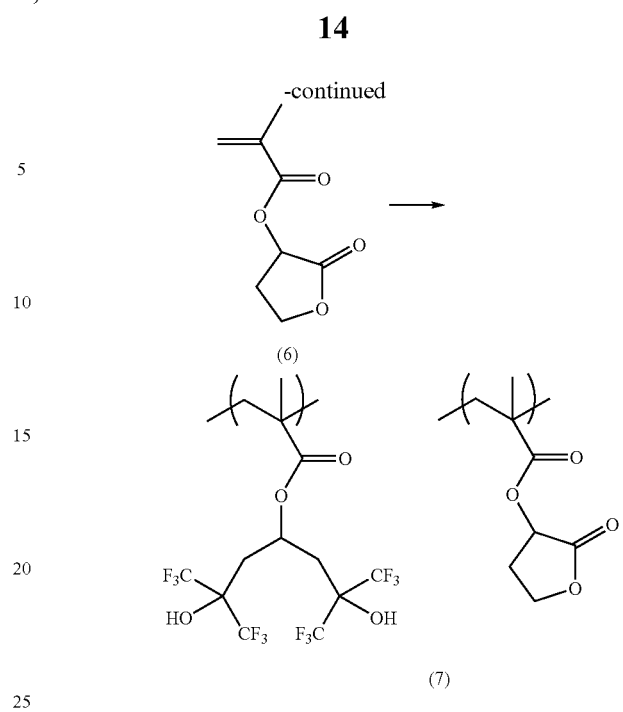

Similar to the method described in Example 1, a copolymerization reaction of the compound (5) and the compound (6) was conducted, thereby obtaining the polymer compound (7). The polymerization reaction is shown in Table 1. The obtained polymer compound is shown in Table 2.

EXAMPLE 4

Synthesis of Polymer Compound (9)

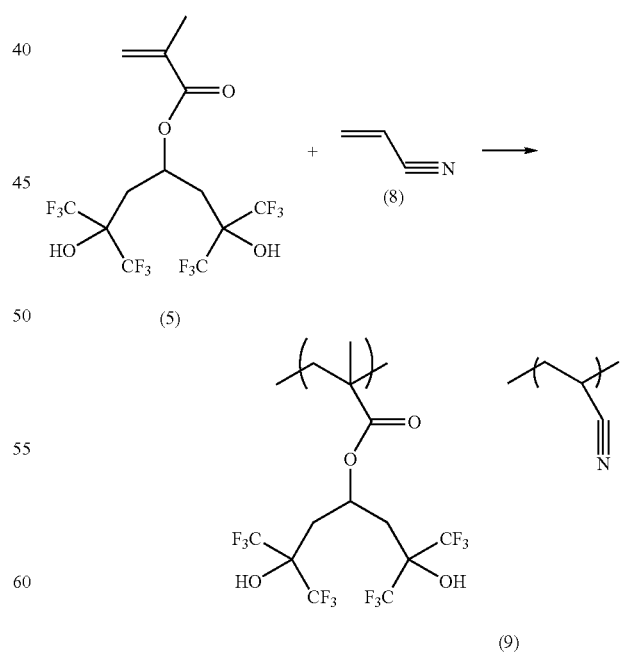

Similar to the method described in Example 1, a copolymerization reaction of the compound (5) and the compound (8) was conducted, thereby obtaining the polymer compound (9). The polymerization reaction is shown in Table 1. The obtained polymer compound is shown in Table 2.

EXAMPLE 5

Synthesis of Polymer Compound (13)

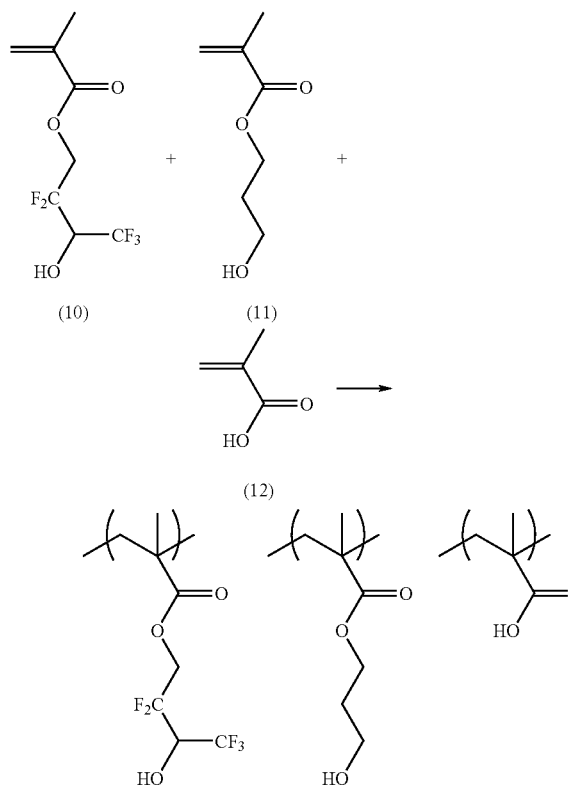

Similar to the method described in Example 1, a copolymerization reaction of the compound (10), the compound (11) and the compound (12) was conducted, thereby obtaining the polymer compound (13). The polymerization reaction is shown in Table 1. The obtained polymer compound is shown in Table 2.

EXAMPLE 6

Synthesis of Polymer Compound (17)

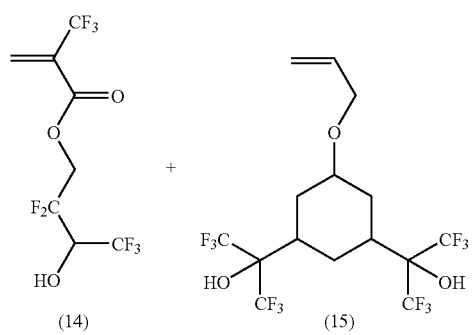

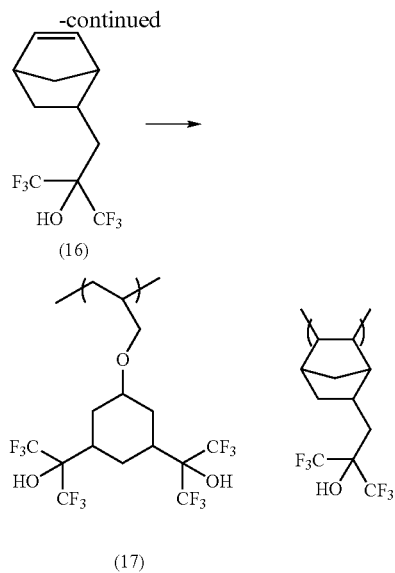

Similar to the method described in Example 1, a copolymerization reaction of the compound (14), the compound (15) and the compound (16) was conducted, thereby obtaining the polymer compound (17). The polymerization reaction is shown in Table 1. The obtained polymer compound is shown in Table 2.

EXAMPLE 7

Preparation of Blend Composition (19)

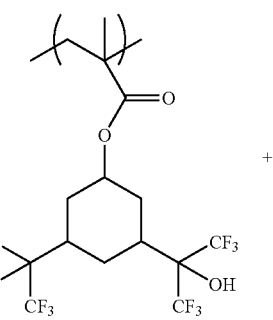

The polymer compound (2) (9.0 g) synthesized in Example 1 was put into a 300 ml conical flask equipped with a stirrer, followed by adding dehydrated tetrahydrofuran (200 ml) for dissolution. To this the polymer compound (18) (weight-average molecular weight Mw=9,500; Dispersion Degree: Mw/Mn=2.10; 9.0 g) was added for dissolution. Then, the solution was added to n-hexane (1600 ml), followed by stirring. The resulting precipitate was filtered and taken out. This was dried at 50° C. for 22 hr, thereby obtaining the polymer compound (19) (16.1 g) of a white color solid.

EXAMPLE 8
Synthesis of Polymer Compound (22)

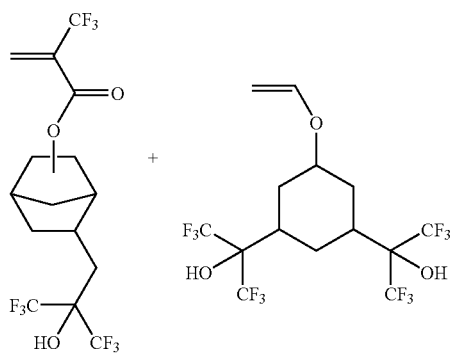

(20)  (21)

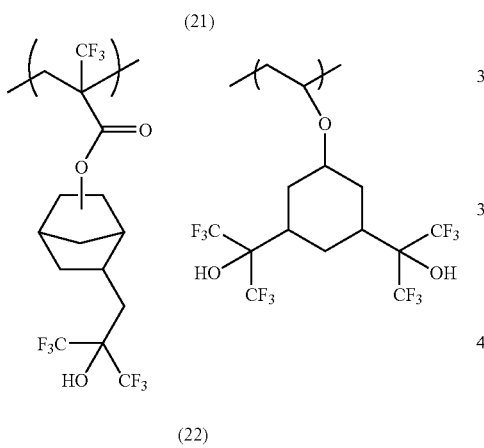

(22)

Similar to the method described in Example 1, a copolymerization reaction of the compound (20) and the compound (21) was conducted, thereby obtaining the polymer compound (22). The polymerization reaction is shown in Table 1. The obtained polymer compound is shown in Table 2.

EXAMPLE 9

Synthesis of Polymer Compound (24)

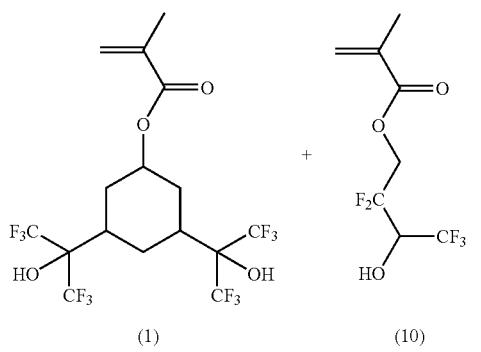

(1)  (10)

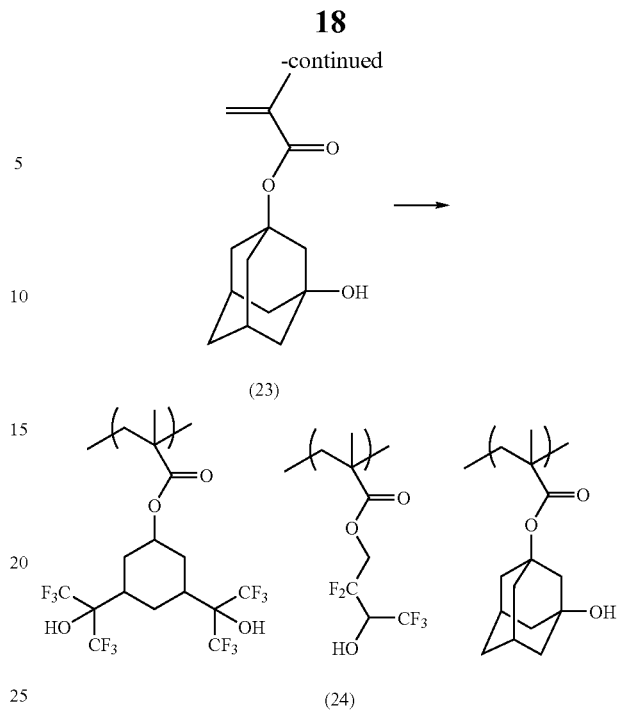

(23)

(24)

Similar to the method described in Example 1, a copolymerization reaction of the compound (1), the compound (10) and the compound (23) was conducted, thereby obtaining the polymer compound (24). The polymerization reaction is shown in Table 1. The obtained polymer compound is shown in Table 2.

EXAMPLE 10
Synthesis of Polymer Compound (28)

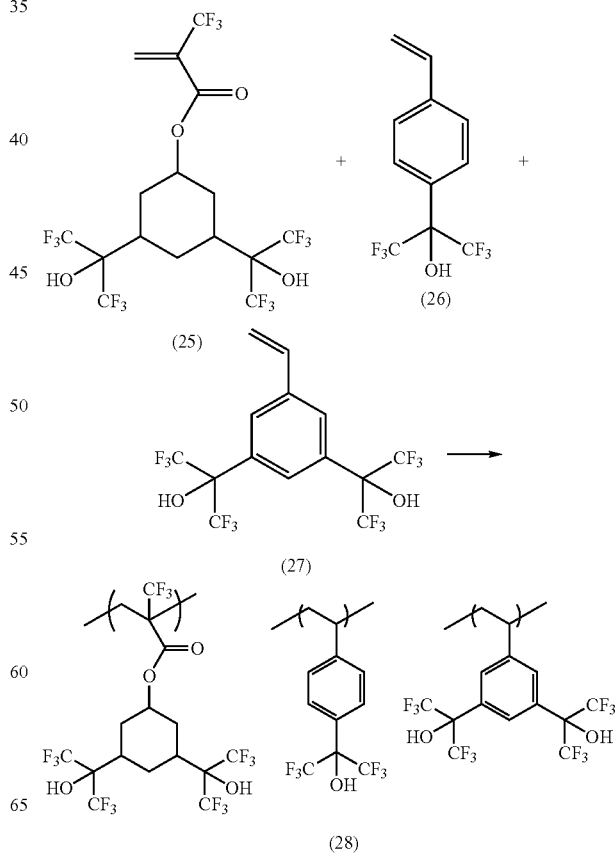

(25)  (26)

(27)

(28)

Similar to the method described in Example 1, a copolymerization reaction of the compound (25), the compound (26) and the compound (27) was conducted, thereby obtaining the polymer compound (28). The polymerization reaction is shown in Table 1. The obtained polymer compound is shown in Table 2.

EXAMPLE 11

Synthesis of Polymer Compound (30)

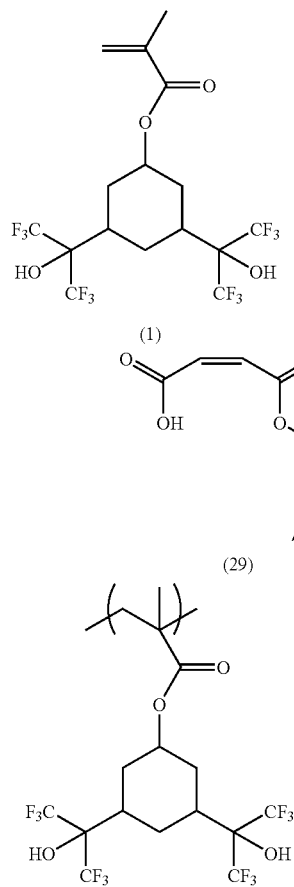

Similar to the method described in Example 1, a copolymerization reaction of the compound (1) and the compound (29) was conducted, thereby obtaining the polymer compound (30). The polymerization reaction is shown in Table 1. The obtained polymer compound is shown in Table 2.

EXAMPLE 12

Synthesis of Polymer Compound (32)

The method described in Example 1 was similarly conducted except in that the purification by the reprecipitation after the reaction was conducted with a mixed solvent of methanol and water (8:2 in weight; 800 ml). With this, the polymer compound (32) was obtained by a copolymerization reaction of the compound (1) and the compound (31). The polymerization reaction is shown in Table 1. The obtained polymer compound is shown in Table 2.

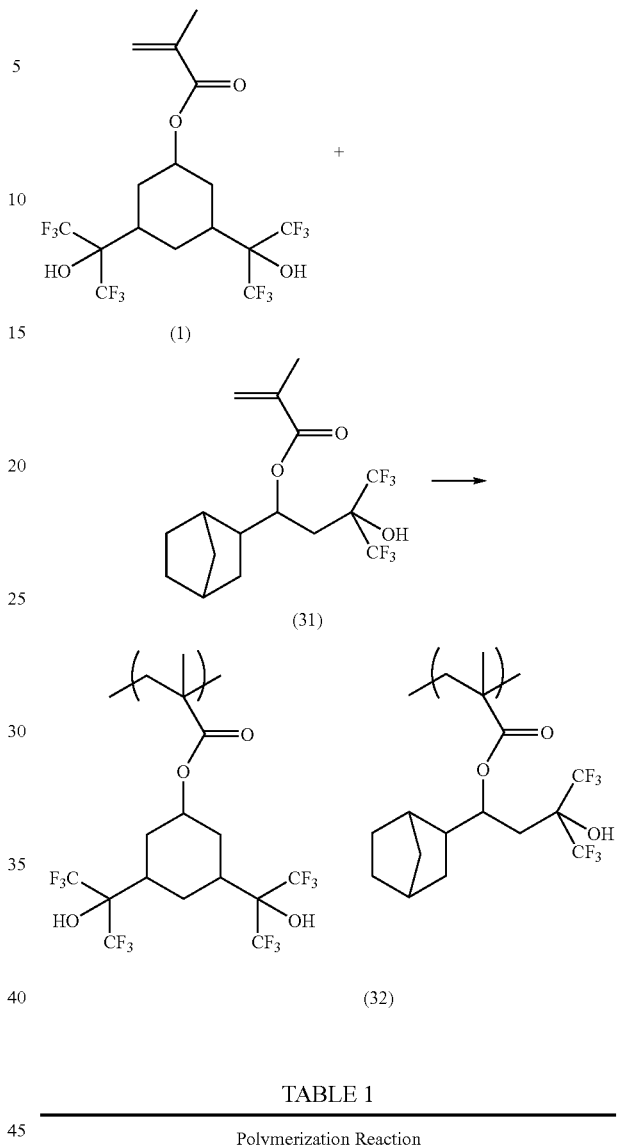

TABLE 1

| | | Polymerization Reaction | | | |
|---|---|---|---|---|---|
| Example | Monomer | AIBN | n-dodecyl-mercaptane | methyl ethyl ketone | Polymerization Condition Temp./Time |
| 1 | Comp. (1): 50.0 g | 0.8 g | 1.0 g | 200 ml | 75° C./18 hr |
| 2 | Comp. (1): 30.0 g Comp. (3): 6.0 g | 1.0 g | 1.2 g | 150 ml | 77° C./22 hr |
| 3 | Comp. (5): 12.0 g Comp. (6): 4.4 g | 0.4 g | 0.5 g | 60 ml | 75° C./18 hr |
| 4 | Comp. (5): 21.0 g Comp. (8): 2.4 g | 0.8 g | 0.9 g | 100 ml | 75° C./16 hr |
| 5 | Comp. (10): 15.0 g Comp. (11): 5.2 g Comp. (12): 2.1 g | 1.0 g | 1.2 g | 100 ml | 77° C./15 hr |

TABLE 1-continued

Polymerization Reaction

| Example | Monomer | AIBN | n-dodecyl-mercaptane | methyl ethyl ketone | Polymerization Condition Temp./Time |
|---|---|---|---|---|---|
| 6 | Comp. (14): 12.0 g<br>Comp. (15): 18.8 g<br>Comp. (16): 10.9 g | 1.0 g | 0.1 g | 120 ml | 75° C./18 hr |
| 8 | Comp. (20): 28.0 g<br>Comp. (21): 24.4 g | 1.0 g | 0.1 g | 200 ml | 75° C./18 hr |
| 9 | Comp. (1): 22.0 g<br>Comp. (10): 4.4 g<br>Comp. (23): 5.2 g | 0.7 g | 0.9 g | 130 ml | 75° C./17 hr |
| 10 | Comp. (25): 14.0 g<br>Comp. (26): 5.1 g<br>Comp. (27): 8.3 g | 0.5 g | 0.1 g | 100 ml | 75° C./17 hr |
| 11 | Comp. (1): 15.0 g<br>Comp. (29): 7.5 g | 0.5 g | 0.3 g | 90 ml | 75° C./17 hr |
| 12 | Comp. (1): 10.0 g<br>Comp. (31): 3.3 g | 0.4 g | 0 | 30 ml | 75° C./17 hr |

TABLE 2

Polymer Compound

| Ex. | Polymer Compound | Yield | Weight-average Molecular Weight Mw | Degree of Dispersion Mw/Mn |
|---|---|---|---|---|
| 1 | Polymer Compound (2) | 22.0 g | 6,400 | 1.62 |
| 2 | Polymer Compound (4) | 27.3 g | 8,200 | 2.11 |
| 3 | Polymer Compound (7) | 8.8 g | 4,900 | 1.72 |
| 4 | Polymer Compound (9) | 12.7 g | 6,600 | 2.00 |
| 5 | Polymer Compound (13) | 16.9 g | 8,600 | 1.90 |
| 6 | Polymer Compound (17) | 15.0 g | 6,000 | 1.65 |
| 8 | Polymer Compound (22) | 33.2 g | 7,100 | 1.70 |
| 9 | Polymer Compound (24) | 22.1 g | 9,300 | 1.98 |
| 10 | Polymer Compound (28) | 15.7 g | 8,100 | 1.66 |
| 11 | Polymer Compound (30) | 9.2 g | 5,500 | 1.72 |
| 12 | Polymer Compound (32) | 7.1 g | 6,700 | 1.66 |

EXAMPLES 13-24

When the polymer compounds obtained by Examples 1-12 were dissolved in solvents to have respective combinations shown in Table 3 to have a solid matter content of 3%, a homogeneous transparent polymer solution (top coat composition solution) was obtained in each case. Herein, the following solvents (A), (B) and (C) were used as partially fluorinated solvents. A mixed solvent of 80% t-butanol and 20% hexane was used in Example 20. A mixed solvent of 95% n-heptane and 5% n-hexyl alcohol was used in Example 24.

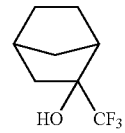
(A)

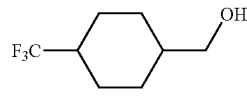
(B)

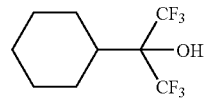
(C)

Then, respective polymer solutions were spin-coated on silicon wafers, followed by baking at 110° C., thereby obtaining homogeneous top coat films. These top coat films were immersed in 2.38 wt % tetramethylammonium hydroxide aqueous solution. With this, they were dissolved immediately, and the films disappeared.

Furthermore, when the obtained top coat films were immersed in pure water for 30 minutes, swelling and dissolution did not particularly occur.

TABLE 3

Preparation of Top Coat Composition Solution

| Ex. | Polymer Compound | Solvent | Dissolution | Developing Solution Dissolution |
|---|---|---|---|---|
| 13 | Polymer Compound (2) | Amyl alcohol | Good | Good |
| 14 | Polymer Compound (4) | Isobutanol | Good | Good |
| 15 | Polymer Compound (7) | Hexyl alcohol | Good | Good |
| 16 | Polymer Compound (9) | Solvent (A) | Good | Good |
| 17 | Polymer Compound (13) | Solvent (B) | Good | Good |
| 18 | Polymer Compound (17) | Amyl alcohol | Good | Good |
| 19 | Blend of Example 7 | Solvent (C) | Good | Good |
| 20 | Polymer Compound (22) | Solvent (C) | Good | Good |
| 21 | Polymer Compound (24) | t-butanol 80 hexane 20 | Good | Good |
| 22 | Polymer Compound (28) | Solvent (B) | Good | Good |
| 23 | Polymer Compound (30) | Cyclohexanol | Good | Good |
| 24 | Polymer Compound (32) | n-heptane 95 n-hexyl alcohol 5 | Good | Good |

EXAMPLE 25

The polymer solutions (top coat composition solutions) of Table 3 obtained by Examples 13-24 were spin-coated on the photoresist films obtained by the after-mentioned Reference Example to have thicknesses of about 40 nm, followed by baking at 110° C., thereby obtaining homogeneous top coat films on the resist films. These two-layer films were immersed in 2.38 wt % tetramethylammonium hydroxide aqueous solution. With this, only the top coat layer of the upper layer was immediately dissolved, and only the original photoresist film remained.

EXAMPLE 26

The polymer solutions (top coat composition solutions) of Table 3 obtained by Examples 13-24 were spin-coated on the photoresist films obtained by the after-mentioned Reference Example to have thicknesses of about 40 nm, followed by baking at 110° C. to obtain two-layer films and then covering the two-layer films with pure water with a thickness of 1 mm. Ultraviolet exposure was conducted from above of the water surface of them through a photomask using a high-pressure mercury lamp, followed by removing pure water and then conducting a post exposure baking at 130° C. Then, a development was conducted at 23° C. for 1 minute using 2.38 wt % tetramethylammonium hydroxide aqueous solution. As a result, in each case, the top coat film was entirely dissolved, and the exposed part of the resist film was dissolved at the same time, and only the unexposed part of the substrate remained in the form of rectangular pattern.

EXAMPLE 27

A 1,000 ml round-bottom flask equipped with a reflux condenser and a stirrer was charged with the compound (1) (150 g), perbutyl PV (t-butylperoxy pivalate initiator made by NOF CORPORATION) (3.01 g), n-dodecylmercaptane (1.21 g), and methyl ethyl ketone (600 g), followed by replacing the flask interior with nitrogen. This was heated to have an interior temperature of 68° C., and stirring was conducted for 18 hr. After the reaction, the reaction solution was added to n-hexane (10,000 ml), followed by stirring. The resulting precipitate was filtered out. This was subjected to a vacuum drying at 50° C. for 20 hr, thereby obtaining the polymer compound (2) (120 g) of a white-color solid. The molecular weight was determined from GPC (standard polystyrene) (Weight-average molecular weight Mw=10,600; The degree of dispersion Mw/Mn=1.57).

EXAMPLES 28-31

The polymer compound (2) obtained by Example 27 was dissolved in solvents to have respective combinations shown in Table 4 to have a solid matter content of 2.5 wt %. In Example 28, a mixed solvent of 95 wt % n-heptane and 5 wt % n-hexyl alcohol was used. In Example 29, a mixed solvent of 96 wt % n-decane and 4 wt % 1-octanol was used. In Example 30, a mixed solvent of 95 wt % n-decane and 5 wt % 2-octanol was used. In Example 31, di-n-butyl ether was used. In each case, a homogeneous, transparent polymer solution (top coat composition solution) was obtained.

Then, respective polymer solutions (top coat composition solutions) were spin-coated on silicon wafers, followed by baking at 110° C., thereby obtaining homogeneous top coat films. These top coat films were immersed in 2.38 wt % tetramethylammonium hydroxide aqueous solution. With this, they were dissolved immediately, and the films disappeared.

Furthermore, the obtained top coat films were immersed in pure water for 30 minutes. With this, neither swelling nor dissolution has occurred.

TABLE 4

| Ex. | Polymer Compound | Solvent | Dissolution | Developing Solution Dissolution |
|---|---|---|---|---|
| 28 | Polymer Compound (2) | n-heptane 95 n-hexyl alcohol 5 | Good | Good |
| 29 | Polymer Compound (2) | n-decane 96 1-octanol 4 | Good | Good |
| 30 | Polymer Compound (2) | n-decane 95 2-octanol 5 | Good | Good |
| 31 | Polymer Compound (2) | di-n-butyl ether | Good | Good |

EXAMPLE 32

The polymer solutions (top coat composition solutions) of Table 4 obtained by Examples 28-31 were spin-coated on the photoresist films obtained by the after-mentioned Reference Example to have thicknesses of about 40 nm, followed by baking at 110° C., thereby obtaining homogeneous top coat films on the resist films. These two-layer films were immersed in 2.38 wt % tetramethylammonium hydroxide aqueous solution. With this, only the top coat layer of the upper layer was immediately dissolved, and only the original photoresist film remained.

EXAMPLE 33

The polymer solutions (top coat composition solutions) of Table 4 obtained by Examples 28-31 were spin-coated on the photoresist films obtained by the after-mentioned Reference Example to have thicknesses of about 40 nm, followed by baking at 110° C. to obtain two-layer films and then covering the two-layer films with pure water with a thickness of 1 mm. Ultraviolet exposure was conducted from above of the water surface of them through a photomask using a high-pressure mercury lamp, followed by removing pure water and then conducting a post exposure baking at 130° C. Then, a development was conducted at 23° C. for 1 minute using 2.38 wt % tetramethylammonium hydroxide aqueous solution. As a result, in each case, the top coat film was entirely dissolved, and the exposed part of the resist film was dissolved at the same time, and only the unexposed part of the substrate remained in the form of rectangular pattern.

REFERENCE EXAMPLE

Resist Composition and Resist Film Synthesis Example

Similar to the method described in Example 1, three components of the compound (6), the compound (23) and the compound (33) were subjected to a copolymerization reaction, thereby obtaining the polymer compound (34) suitable for ArF excimer laser.

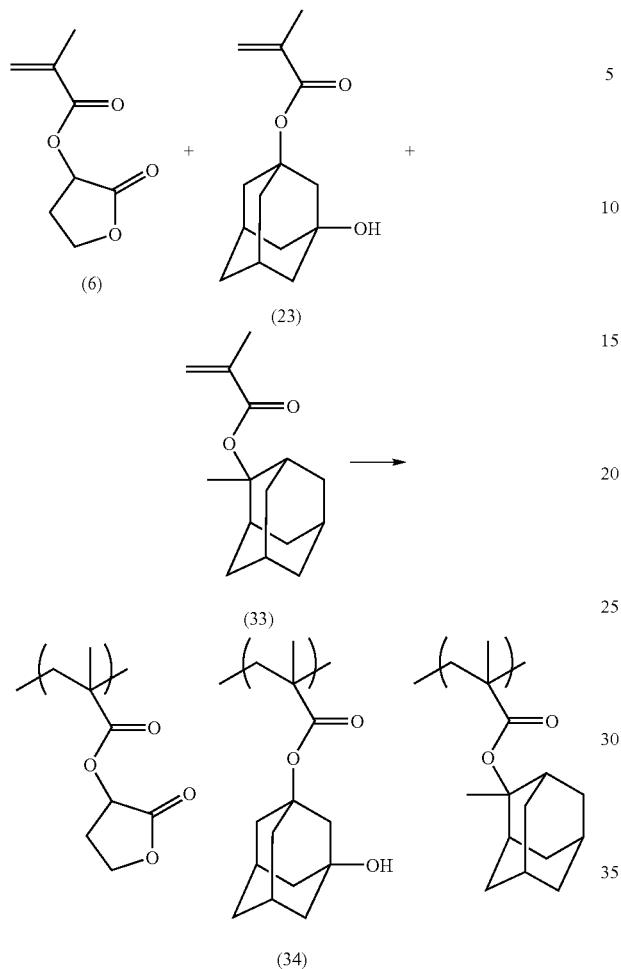

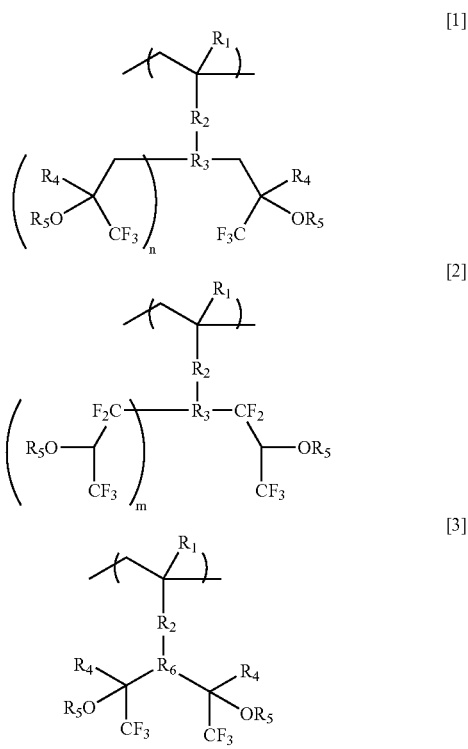

Then, the polymer compound (34) was dissolved in propylene glycol methyl acetate to have a solid content of 12%. Furthermore, triphenylsulfonium triflate (TPS105) made by Midori Kagaku Co., Ltd. as an acid generator was dissolved to be 2 parts by weight per 100 parts by weight of the polymer compound (34), thereby preparing a resist solution. The obtained resist solution was spin-coated, followed by baking at 110° C. to obtain a resist film.

COMPARATIVE EXAMPLE

Development Example in a System Using No Top Coat Film

The resist film obtained by the above Reference Example was covered with pure water with a thickness of 1 mm. Ultraviolet exposure was conducted from above of the water surface of them through a photomask using a high-pressure mercury lamp, followed by removing pure water and then conducting a post exposure baking at 130° C. Then, a development was conducted at 23° C. for 1 minute using 2.38 wt % tetramethylammonium hydroxide aqueous solution. As a result, the resist pattern with the dissolved exposed part remained. Its shape was of T-top and was not in the rectangular form.

What is claimed is:

1. A top coat composition characterized in that it is applied to a photoresist top surface by using a polymer containing at least one structure represented by the formula [1], [2] or [3], in the formulas, $R_1$ represents a hydrogen, fluorine, cyano group, methyl group or trifluoromethyl group; $R_2$ represents O, (C=O)O, $CH_2O$, or a single bond; $R_3$ represents a cyclohexyl ring, of which hydrogens may partially be replaced with CH or hydroxyl group or halogen; $R_4$ represents a trifluoromethyl group; $R_5$ represents a hydrogen or protective group optionally containing fluorine; n represents 1 or 2; m represents 1; and $R_6$ represents an alicyclic group.

2. A top coat composition according to claim 1, wherein a polymer containing together a plurality of the structure represented by the formula [1], [2] or [3] is used.

3. A top coat composition according to claim 1, wherein a copolymer containing the at least one structure represented by the formula [1], [2] or [3] and an acrylonitrile is used.

4. A top coat composition according to claim 1, wherein a copolymer containing the at least one structure represented by the formula [1], [2] or [3] and the formula [4] is used, in the formula $R_7$ and $R_8$ are alkyl groups optionally containing hydrogen or ring form of a carbon number of 1-20 and optionally contain fluorine, hydroxyl group, carboxyl group, ether group, ester group and fluorocarbinol group, and herein $R_7$ and $R_8$ may be identical or different.

5. A top coat composition according to claim 1, wherein a copolymer containing the at least one structure represented by the formula [1], [2] or [3] and the formula [5] is used,

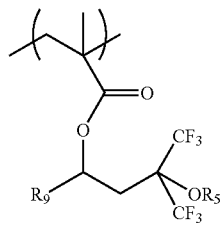

[5]

in the formula $R_5$ represents a hydrogen or protective group optionally containing fluorine, and $R_9$ represents an alicyclic group or aryl group.

6. A top coat composition solution comprising a top coat composition according to claim 1, which is dissolved in an organic solvent.

7. A top coat composition solution comprising a top coat composition according to claim 1 and a photoacid generator, which are dissolved in an organic solvent.

8. A top coat composition solution according to claim 6, wherein the organic solvent is a mixed solvent of one or at least two of the group consisting of a cyclic or linear hydrocarbon of a carbon number of 5-20, an alcohol of a carbon number of 1-20, and a cyclic or linear hydrocarbon partially replaced with fluorine.

9. A top coat composition solution according to claim 6, wherein the organic solvent is a solvent resulting from mincing together a hydrocarbon of a carbon number of 5-20 in an amount of not less than 50% and less than 99.9% and an alcohol of a carbon number of 1-20 in an amount of not less than 0.10% and less than 50%.

10. A top coat composition according to claim 1, which is characterized in that it is used in immersion lithography.

11. A top coat composition solution according to claim 6, which is characterized in that it is used in immersion lithography.

\* \* \* \* \*